(12) United States Patent
Carlin et al.

(10) Patent No.: US 9,009,319 B2
(45) Date of Patent: Apr. 14, 2015

(54) OPTIMIZING ALLOCATION OF ON-DEMAND RESOURCES USING PERFORMANCE

(75) Inventors: Erik V. Carlin, San Antonio, TX (US); Brad K. McConnell, Cibolo, TX (US)

(73) Assignee: Rackspace US, Inc., San Antonio, TX (US)

( * ) Notice: Subject to any disclaimer, the term of this patent is extended or adjusted under 35 U.S.C. 154(b) by 242 days.

(21) Appl. No.: 13/352,852

(22) Filed: Jan. 18, 2012

(65) Prior Publication Data

US 2013/0185436 A1 Jul. 18, 2013

(51) Int. Cl.
G06F 15/173 (2006.01)
G06F 9/50 (2006.01)

(52) U.S. Cl.
CPC ................. G06F 9/5011 (2013.01)

(58) Field of Classification Search
CPC ....... G06F 9/455; G06F 9/50; G06F 11/3409; H04L 5/0032; H04L 67/1029; H04W 72/04
See application file for complete search history.

(56) References Cited

U.S. PATENT DOCUMENTS

| | | | |
|---|---|---|---|
| 6,922,724 B1 * | 7/2005 | Freeman et al. | 709/223 |
| 7,603,671 B2 * | 10/2009 | Liu | 718/1 |
| 7,643,468 B1 * | 1/2010 | Arregoces et al. | 370/351 |
| 7,787,414 B2 * | 8/2010 | Le Faucheur et al. | 370/328 |
| 8,032,914 B2 * | 10/2011 | Rodriguez | 725/97 |
| 8,380,853 B2 * | 2/2013 | Kudo | 709/226 |
| 2003/0182413 A1 * | 9/2003 | Allen et al. | 709/223 |
| 2003/0191857 A1 * | 10/2003 | Terrell et al. | 709/244 |
| 2010/0020806 A1 | 1/2010 | Vahdat et al. | |
| 2010/0131957 A1 * | 5/2010 | Kami | 718/104 |
| 2011/0301998 A1 * | 12/2011 | Talwar et al. | 705/7.26 |
| 2012/0134440 A1 * | 5/2012 | Yun et al. | 375/295 |
| 2012/0226789 A1 * | 9/2012 | Ganesan et al. | 709/223 |
| 2013/0060966 A1 * | 3/2013 | Moisiadis et al. | 709/250 |

OTHER PUBLICATIONS

U.S. Appl. No. 13/036,219, filed Feb. 28, 2011, entitled, "Automated Hybrid Connections Between Multiple Environments in a Data Center," by Christopher Kuehl.

* cited by examiner

Primary Examiner — Joshua Joo
Assistant Examiner — Younes Naji
(74) Attorney, Agent, or Firm — Trop, Pruner & Hu, P.C.

(57) ABSTRACT

In one embodiment, the present invention can be used to efficiently allocate on-demand resources to a customer of a data center such as a multi-tenant data center having resources dedicated to given customers, as well as on-demand resources that can be flexibly provisioned to customers using a performance zone concept realized via logical switches to present a single logical network to the customer.

8 Claims, 4 Drawing Sheets

PHYSICAL VIEW
WITH PERFORMANCE ZONES

LOGICAL VIEW
S1 = PZA
S2 = PZA
S3 = PZB
S4 = PZC

CUSTOMER VIEW

OPTIMIZING ALLOCATION OF ON-DEMAND RESOURCES USING PERFORMANCE

BACKGROUND

Data centers are becoming more prevalent, as various institutions seek to centralize computing and data storage resources in a single location. Many such data centers are dedicated to a particular institution and can be housed in that institution's facility directly. Other data centers can be of a multi-tenant arrangement, in which various resources of different customers of the data center are present in a single data center location.

In addition to these data center models, cloud computing is also becoming predominant. In general, cloud computing means that various resources can be flexibly allocated to multiple entities to provide for on-demand computing resources as needs dictate. Such entities can range from individual users to large corporations.

It is oftentimes difficult to efficiently allocate such cloud resources to requesters, given variances in the requests as well as the uncertainties regarding usage patterns and so forth. These challenges include a need to share a network broadcast domain, a need to allow space for organic growth within a given server collection, and a need to reduce a customer's risk to multiple failures at the same time, among others.

SUMMARY OF THE INVENTION

According to one aspect, the present invention can be used to efficiently allocate on-demand resources to a customer of a data center such as a multi-tenant data center having resources dedicated to given customers, as well as non-dedicated and on-demand resources that can be flexibly provisioned to customers.

In one embodiment, the present invention includes a method for receiving a user request for allocation of an on-demand resource within a data center having a plurality of performance zones each logically connected by a logical network, determining whether the user request includes a performance zone request for placement in a given performance zone, and if so determining whether a resource corresponding to the requested on-demand resource is available within the requested performance zone. If this resource is available, it can be assigned to the user the resource within the requested performance zone, and otherwise the user request can be made to fail.

If however the user request does not include a performance zone request, a resource within a second performance zone (outside of the performance zone) can be assigned. Further, a tunnel with a predetermined bandwidth can be provided between this resource and another resource of the user within the performance zone. Even though these resources are in different performance zones, they can appear to the user as a single logical network.

Another aspect of the present invention is directed to a system that includes an access layer having multiple server collections, an aggregation layer having first switching devices each coupled to a portion of the server collections, and a core layer including second switching devices each coupled to a portion of the first switching devices. The system can further include multiple performance zones that each is a logical collection of the portion of server collections coupled to the same first switching device. Note that communications within a performance zone may be optimized as compared to communications between performance zones.

The system may include logical switches, each represented by a table for a customer. Such table can include entries, each of which associates an on-demand resource of the customer to a performance zone identifier corresponding to a given performance zone. Via this logical switch the customer can view on-demand resources of the customer located in different performance zones as a single logical network.

The system may further include a scheduler to dynamically allocate an on-demand resource requested by a customer on a server of a first performance zone, where the customer is associated with a performance zone identifier for that performance zone. The scheduler may weight a request by the customer for allocation within this performance zone with a first value and weight a second allocation criteria with a second value, and schedule the resource to the first performance zone based on the weighted allocation request and the weighted second allocation criteria. This resource may be allocated with a quality of service (QoS) guarantee when it is allocated within the first performance zone and without a QoS guarantee when not allocated within this performance zone.

Yet another aspect of the present invention is directed to a multi-tenant data center. This data center can include a number of hosts (e.g., each a server) that can be grouped into different server collections. Each of these server collections may be coupled to a switch of an aggregation layer, which in turn is coupled to switches of a core layer. A customer of the data center may be provided a logical performance zone in which on-demand resources allocated to the customer appear to the customer as a single logical network having a given QoS. Note that at least some of these resources can be located in different ones of the server collections.

DETAILED DESCRIPTION

Figure 1:
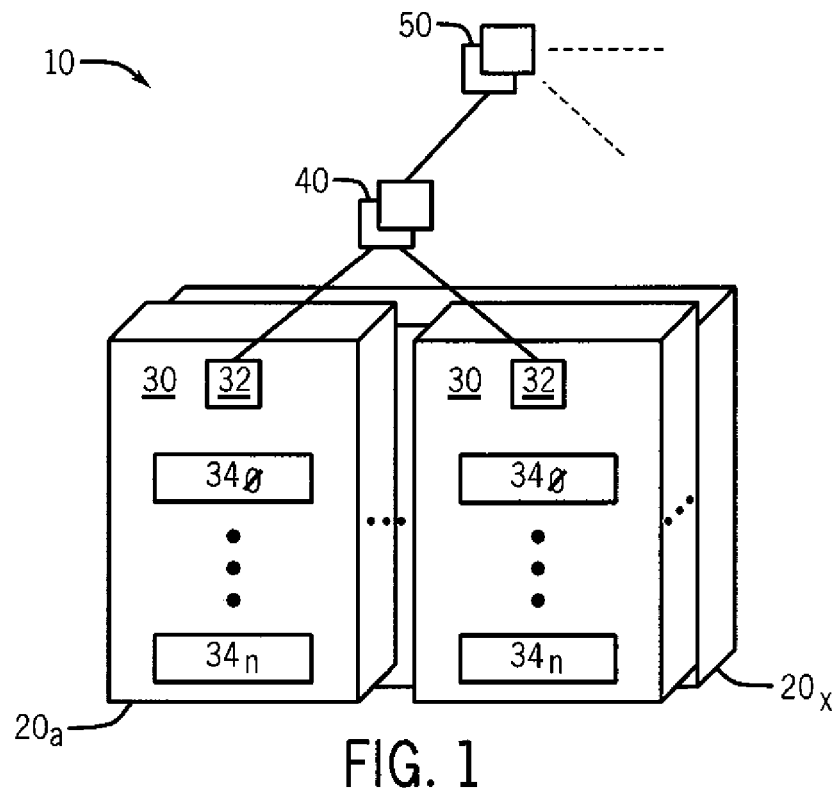
FIG. 1 is a physical view of a portion of a data center in accordance with one embodiment of the present invention.

Referring now to FIG. 1, shown is a physical view of a portion of a data center. In a physical sense, a network includes many different types of computing resources, storage resources, switching resources, networking resources and so forth. However, for purposes of discussion and illustration herein, the view of FIG. 1 is limited to compute resources, namely a plurality of servers 34 (generally). In the illustration of FIG. 1, individual servers $34_0$-$34_n$ can be configured in a cabinet 30. To provide for communications between servers within this cabinet, as well as for communications with outside entities with respect to this cabinet, a switch and/or router 32 may be present. In general, servers 34 can be configured as rack-based servers and may take various forms, including blade-type servers, rack-mounted servers, chassis-enclosed servers and so forth. Each server may generally include at least a processor, memory, network interface circuitry, and mass storage.

A collection of servers present in multiple cabinets can form a huddle 20, which corresponds to a collection of physical servers present in one or more cabinets within a data center that share a substantially homogenous configuration of network, compute, and management capabilities. As an example, a huddle may be formed of servers present in a given number of cabinets. For example, a huddle can be formed of servers present within 10 cabinets. Assume for purposes of example that each cabinet can be configured with 20 servers. Accordingly, a huddle can include a collection of 200 servers in this example.

As further seen in FIG. 1, multiple huddles $20_a$-$20_x$ may be present in an access layer. In turn, each of the huddles can communicate upstream to an aggregation layer that can include multiple switches 40. Thus, communication between different cabinets within huddles of an access layer can occur using switches 40 (and in-cabinet switch 32). In turn, communications with agents outside of this set of huddles can occur via an upstream connection through a core layer, which may include a plurality of switches 50. Of course, although not shown for ease of illustration in FIG. 1, understand that multiple switches of the core layer can be interconnected together, and furthermore multiple switches of the aggregation layer can communicate with a single switch of the core layer. There can be different levels of latency and network capacity at a number of predetermined points. For example, different latencies and capacity can exist with reference to traffic within a huddle, contained to one cabinet; traffic within a huddle traversing between two separate cabinets (same aggregation device); traffic between huddles traversing between two separate cabinets (same aggregation device); traffic between huddles traversing between two separate cabinets, each cabinet connected to a different aggregation point; and traffic between huddles located in different data centers.

This configuration provides for great efficiency of communication between servers within a single cabinet having great bi-sectional bandwidth. However, as communications pass upstream, bi-sectional bandwidth is reduced. For example, assume that each server within a cabinet includes a network interface controller (NIC) that can communicate at a bandwidth of 1 gigabits per second (Gbps). However, assume that the upstream channel coupled between the access layer and the aggregation layer (e.g., between switch 32 and switch 40) only provides a bandwidth of 4 Gbps. Accordingly, this upstream channel can be oversubscribed if much of the communications occurring within the servers of the cabinet are directed to entities outside the cabinet. Similarly, note that multiple upstream channels from different cabinets are coupled to switches 40 of the aggregation layer. However, the upstream channel between these switches 40 and the switches 50 of the core layer may be limited to a bandwidth of, e.g., 10 Gbps. Again, when communications are directed to entities outside this aggregation layer, upstream bandwidth can be oversubscribed.

In addition to the oversubscription issue, note also that resources within a cabinet can become stranded, namely unused or unallocated for at least some amounts of time. That is, in a multi-tenant data center, typically all servers within a cabinet are associated with a single client such that all the servers within the cabinet are dedicated to that client. When a client or customer has not fully purchased the amount of servers present in a cabinet, typically the remaining servers (if present) cannot be allocated to other customers. And, space must remain available for the customer to be able to insert additional resources over time as the customer's compute needs increase. Furthermore, when dynamically allocating additional compute resources to a client, those resources are typically included in the same cabinet as the client's other compute resources, or at least in the same huddle. That is, a single customer's compute resources are typically assigned to a single huddle. Thus not only is potential compute resource space within a cabinet limited, so too is the amount of space in a huddle limited to provide for future growth in compute resources for the customers within the huddle. In addition, compute resources of a single customer, if they are to share a single Internet protocol (IP) address, are to be maintained in a single huddle.

Note that the above discussion with regard to the physical network of FIG. 1 assumes that the various cabinets and other resources are of a dedicated compute domain of the multi-tenant data center such that each physical server is dedicated to a single customer (and of course each customer can have many such servers dedicated to it). In addition to such dedicated resources, a multi-tenant data center may further include a so-called cloud domain, in which additional resources for a customer can be provided on an as-needed, on-demand basis. Thus, as web traffic for a customer increases (for example), additional compute resources can be allocated to the customer for only a limited amount of time. Furthermore, these additional resources can be shared among multiple customers of the data center. That is, a single physical server may accommodate multiple virtual machines (VMs), each of which can be associated with a different customer of the data center. Thus rather than the dedicated compute domain in which a physical server is associated with a single customer, in the cloud compute domain, multiple customers each can have associated with it one or more virtual machines housed in a single physical server.

Accordingly, to provide for greater use of resources within a multi-tenant data center, embodiments introduce the concept of logical networks formed of different performance zones. By providing such logical networks with performance zones, policies can be set to provision additional resources for a given customer such that these resources (including on-demand resources) within different physical cabinets, racks or other enclosures of a data center can be more efficiently utilized. For example, with regard to on-demand compute resources, embodiments may enable additional compute resources to be allocated to a customer over time, where these compute resources need not be included in a same cabinet or even same huddle as other compute resources of the customer.

Figure 2:
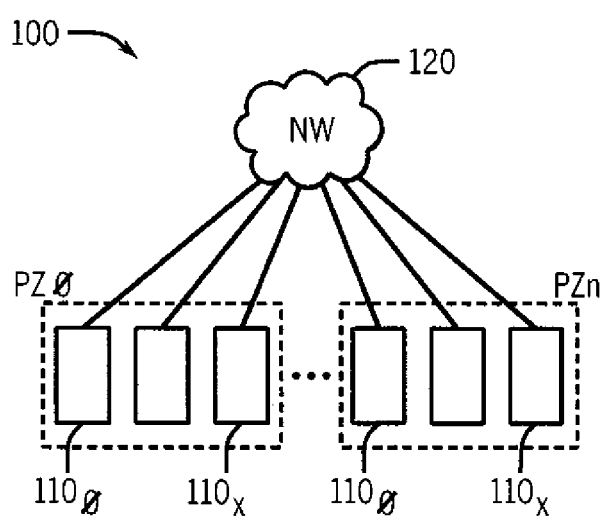
FIG. 2 is an illustration of a block diagram of a logical network in accordance with an embodiment of the present invention.

FIG. 2 illustrates a block diagram of a logical network in accordance with an embodiment of the present invention. As shown in FIG. 2, a logical view of a data center 100 may include multiple performance zones $PZ_0$-PZn. Within each performance zone multiple virtual machines $110_0$-$110x$ may be provided. And the different performance zones can couple together via a logical network 120.

Thus the illustration of FIG. 2 shows a logical view of a data center. The translation between physical components within a data center and logical components may be by way of one or more mapping tables that map physical resources to corresponding logical resources. Furthermore, understand that multiple logical devices such as multiple virtual machines can be configured on a single physical device such as a single physical server.

Furthermore with regard to FIG. 2, note that the concept of performance zones is introduced. As used herein, the term "performance zone" is defined as a collection of logical resources within a constrained logical portion of a logical network environment. By configuring different logical resources for a single customer within a single performance zone, optimized processing can be realized, in that a single performance zone provides processing with reduced latency. In the implementation of FIG. 2, note that the individual virtual machines 110 can be present within one or more physical servers. Furthermore, individual performance zones PZ can also be present within one or more physical servers. More typically, in various implementations a single performance zone may include a variety of logical devices located within multiple physical servers or other physical devices. In fact, a typical performance zone may constitute a collection of logical devices within multiple cabinets, and even multiple huddles. As will be seen below, a given performance zone can span arbitrarily over physical devices of a data center such that a performance zone can extend beyond the physical constraints of a network for a given tenant of the data center, e.g., via dedicated tunnels with guaranteed performance.

Figure 3:
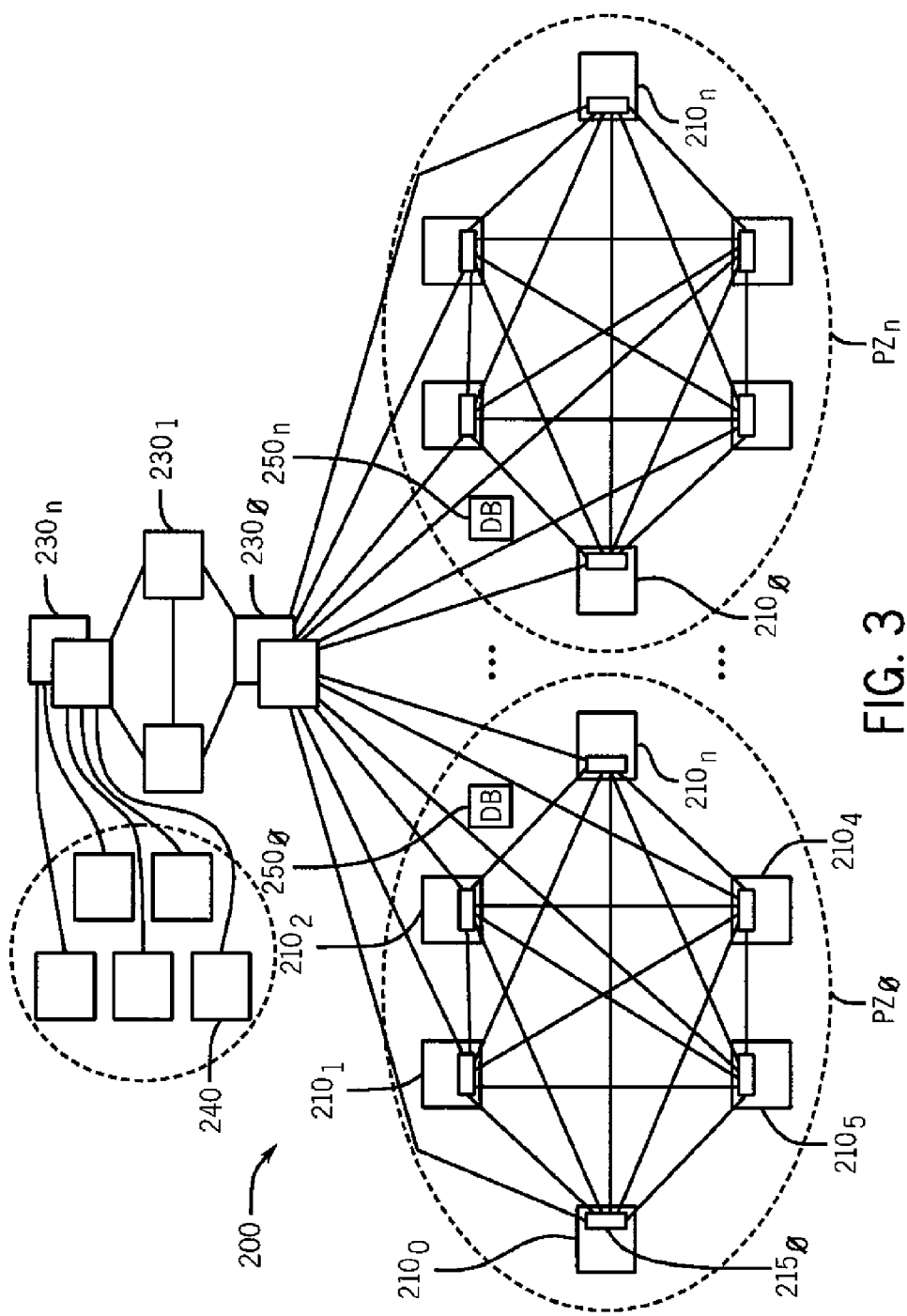
FIG. 3 is a block diagram of a logical network view of computing resources in accordance with an embodiment of the present invention.

Referring now to FIG. 3, shown is a more detailed block diagram of a logical network view of computing resources in accordance with an embodiment of the present invention. As shown in FIG. 3, logical network 200 can be formed of a collection of physical devices $210_0$-$210n$. As an example, each physical device 210 may correspond to a physical host such as a physical server that includes various compute resources such as one or more processors, networking components, memory, storage and so forth. Each of these host physical servers or hosts 210 can include various hardware, firmware and software. For purposes of illustration, assume that each host 210 includes at least one hypervisor to execute thereon. In turn, a hypervisor may communicate with a virtual switch of the host that in turn can be coupled to multiple virtual machines, on which different applications or other user software can execute. Also in this logical network configuration, computing resources such as VMs of multiple clients can be present within a single host.

With regard to logical network 200, multiple individual hosts can be coupled together in a full mesh network via virtual switches. Thus as seen in FIG. 3, each physical host 210 within a performance zone (e.g., PZ0) can include a virtual switch 215 to be directly connected (that is, by a point-to-point connection) to a corresponding virtual switch of each other host within the performance zone. The virtual switches thus are used to communicate internally within a server between hypervisor and VMs. Note that the interconnections between virtual switches collectively can be viewed by a customer as a logical switch of a given network of the customer. That is, a logical switch acts as a customer abstraction to present interconnection of virtual switches of disparate hosts to appear as a single logical network, regardless of actual physical location of the hosts.

As an example, each host 210 can be present within a single cabinet, or the hosts can be present in different cabinets. In addition to a virtual switch that provides for a communication path between hypervisor and individual VMs, each host 210 can be associated with one or more logical switches to provide for interconnection between the different hosts within one or more performance zones.

In one embodiment, such logical switches can be implemented in part as a table that includes entries to provide a mapping between a given host and other hosts. Note that in some embodiments the mapping of which VMs are associated with which logical switches can be held external to the actual virtual or physical switches that exist in the data path. Some examples of these would be an OpenFlow controller, or a LISP mapping database. In the OpenFlow controller example, all knowledge of how VMs communicate with each other over a logical switch is housed outside of the network.

The necessary paths or logical 'wiring' to enable data communication between the VMs is provided to the virtual switch contained within each affected hypervisor. In OpenFlow, these paths are called flows. In the LISP example, the hypervisor is aware that its guest VMs are participating in a LISP domain. When the VMs attempt to initiate traffic, the hypervisor can query an externally located mapping database in order to determine how to encapsulate the guest VMs' traffic in order to direct it to the proper destination hypervisor. The destination hypervisor will then decapsulate the traffic and deliver it to the destination VM.

For purposes of illustration, note that each performance zone shown in FIG. 3 includes 6 individual hosts. However, understand that the scope of the present invention is not limited this regard, and typically many more individual hosts may be present in a given performance zone. For example, in some implementations between approximately 10 and 50,000 hosts may be present in each performance zone, and the number of VMs executing in each host can also vary significantly.

To provide for communications between hosts present in different performance zones, a logical aggregation layer, which may be formed of physical switches 230, may couple together the different performances zones. Note that although only two performance zones are shown in the embodiment of FIG. 3, understand the scope of the present invention is not limited in this regard. In many implementations such as in a data center greater than two such performance zones may couple together via a logical aggregation layer.

As further seen in FIG. 3, in addition to computing resources, various types of other on-demand resources can be provided, both within and outside of the performance zones. As examples, FIG. 3 shows that within the performance zones themselves, database resources $250_0$-$250_n$ can be provided. Various types of database resources such as a database as a service (DBaaS)-type resources can be provided. For example, such DBaaS can be configured as MySQL servers within the performance zones. Or the database resources can take the form of various storage mechanisms such as associated with certain servers within the performance zone or, e.g., a storage area network (SAN) coupled to one or more of the hosts within the performance zone.

As further seen in FIG. 3, additional on-demand resources, namely an external SAN 240 may be present and which can be accessed via switches $230_n$ that in turn couple through switches $230_1$ to switches $230_0$. In the embodiment shown, switches $230_1$ can correspond to a core layer while switches $230_n$ can correspond to another access layer. Although shown with these particular types of on-demand resources, understand that many other types of on-demand resources can be located within and external to performance zones.

Figure 4:
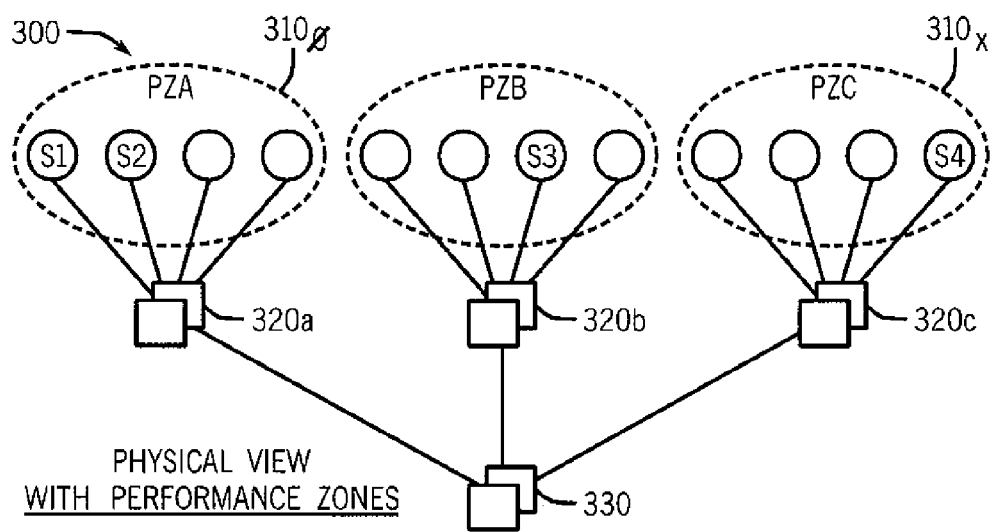
FIG. 4 is a physical view of a data center and a logical view of resources allocated to a given customer within a data center in accordance with one embodiment of the present invention.
Figure 4:
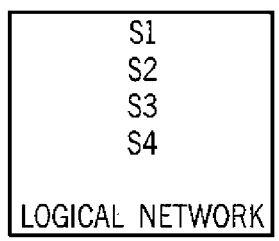

To further illustrate the concept of performance zones in the context of logical networks and further overlaid over a physical network, reference can be made to FIG. 4. FIG. 4 shows a high-level view of a data center architecture. More specifically, FIG. 4 shows a physical view of a data center 300 and a logical view of resources allocated to a given customer within the data center, both from a logical view and the customer's view of the logical network. As seen in FIG. 4, architecture 300 may include a plurality of huddles $310_0$-$310x$. As discussed above, each huddle may include a collection of physical servers configured in one or multiple racks or other cabinets. For purposes of illustration assume that four servers are assigned to a given customer. As seen, each of the servers is present in a different huddle. However, the first two servers, namely servers S1 and S2, are present within huddles of a single performance zone, PZA. Instead, third server, S3, is assigned within a different performance zone, PZB, and finally a fourth server S4 is assigned within yet a different performance zone PZC. Accordingly, better communication performance between servers of this single customer can be achieved between servers S1 and S2, as they are present within a single performance zone.

As further seen in data center 300, multiple individual huddles can be coupled together at an aggregation layer by physical switches 320a-320c. The collections of huddles below the aggregation layer constitutes an access layer, while the switches 320 may be of the aggregation layer. In turn, communications between servers of these different huddles coupled to different physical switches 320 may communicate through a core layer that includes multiple physical switches 330.

Thus with respect to a logical view with performance zones, servers S1 and S2 are present in the same performance zone PZA, while servers S3 and S4 are present in different performance zones, namely zones PZB and PZC. However, a customer's view of the data center may be as a single logical network that includes all of its servers. Thus to the customer there is no distinction between the locations of its servers and accordingly, the performance zone concept can be abstracted away from the customer, in some embodiments.

This is so, as with appropriate scheduling and orchestrating the performance zone for a given customer can span beyond a physical performance zone. Assume 10 huddles connect to an aggregation layer, where these 10 huddles are defined as a first performance zone, PZ(a). All customers that provision VMs within this PZ can connect them to a logical switch that guarantees 100 Mbps of performance (as an example). The aggregation and core physical network layers can include technologies such as MPLS-TE based upon RSVP. When a customer of this PZ(a) provisions a VM in a separate performance zone PZ(b), this may trigger an event that auto-creates a 100 Mbps network reservation, via tunnels, that allows this tenant to span beyond the physical PZ boundary yet still be presented with a single logical or customer-level performance zone.

As such, the concept of performance zones can be used in connection with provisioning of on-demand resources within a data center to flexibly assign resources to a customer. In general, such provisioning may take into account the availability of performance zones within the data center and seek to optimize provisioning of resources by placing on-demand resources requested by a customer within a single performance zone. Furthermore, when provisioning in this way has been achieved such that various on-demand resources for a single customer have been provisioned within a single performance zone, certain quality of service assurances can be provided for communications and computing tasks for the customer given this optimized placement of the on-demand resources.

Figure 5:
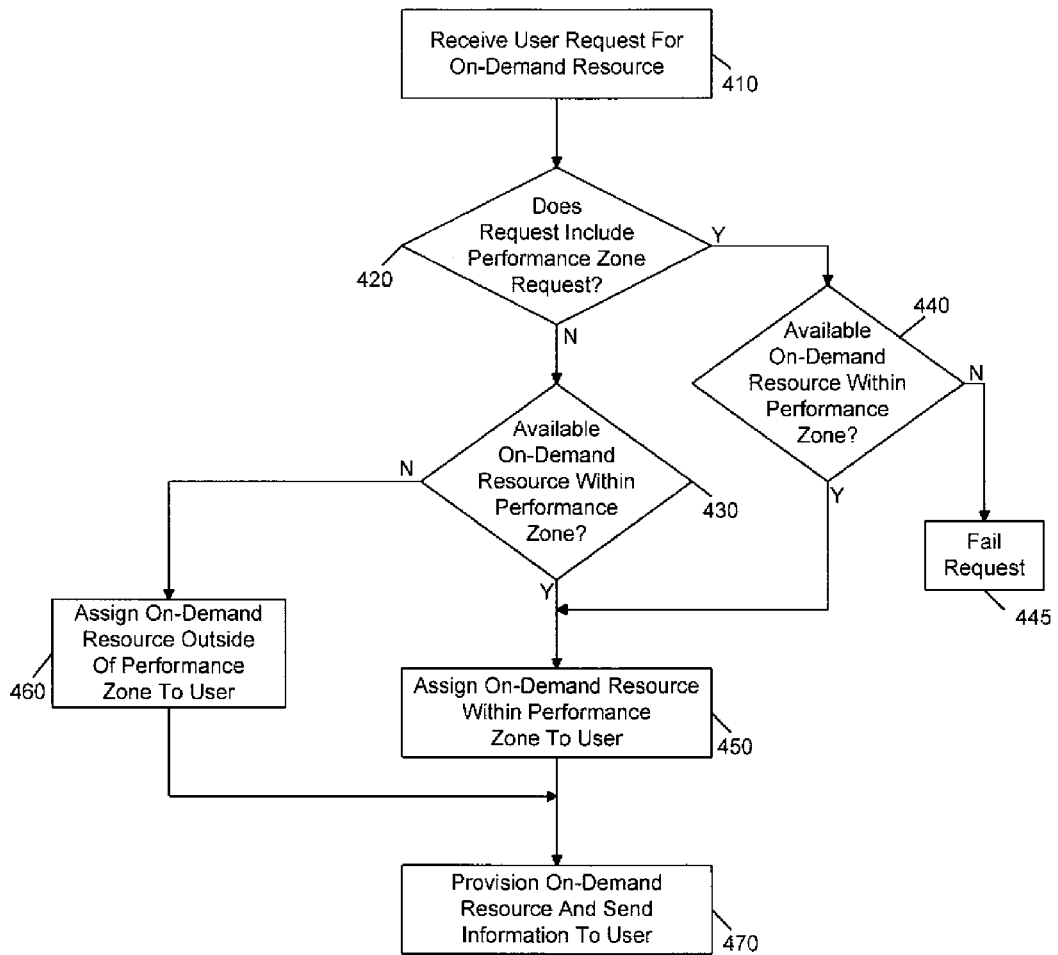
FIG. 5 is a flow diagram of provisioning of on-demand resources for a customer in accordance with one embodiment of the present invention.

Referring now to FIG. 5, shown is a flow diagram of provisioning of on-demand resources for a customer. More specifically, FIG. 5 shows a method 400 that can be used in connection with a provisioning or scheduling algorithm within a data center to allow a customer's request for an on-demand resource to be granted and a given resource to be allocated to that customer. In certain implementations, method 400 can be executed on one or more servers, which can be part of a scheduling complex of the data center. Examples of on-demand resources that can be requested and allocated in accordance with an embodiment of the present invention include compute resources such as server resources that can be implemented as one or more VMs, storage resources such as a block storage, e.g., according to a storage area network (SAN) or file storage according to a network attached storage (NAS), database resources, load balancer resources, switching resources and so forth. As seen in FIG. 5, method 400 may begin by receiving a user request for an on-demand resource (block 410). At diamond 420 it can be determined whether the request includes a performance zone request. In this regard, note that certain implementations of a scheduling algorithm may enable a customer to provide a performance zone request with a resource request (e.g., including a performance zone identifier associated with the customer). However, note that such performance zone request is optional, and it can be assumed in many instances that a customer wishes to have its resource placed within one or more performance zones having a number of other resources of the customer.

If the request is received with a performance zone request, control passes to diamond 440 where it can be determined whether a resource is available within the requested performance zone. For purposes of illustration, assume the resource requested is an on-demand computing resource that can be fulfilled by provisioning of a virtual machine. Thus it can be determined whether a requested performance zone can handle another virtual machine. If so, control passes to block 450 where the resource can be assigned within this performance zone.

Assignment of resources can be according to various scheduling algorithms. For example, in one embodiment a scheduling algorithm can execute a first pass to eliminate or cull some amount of available resources out of the scheduling decision. This culling or elimination of possible placement of an allocated resource can take different forms. For example, in a data center having 100 huddles, the elimination process may, according to some flexible criteria, eliminate half of the huddles from consideration in a scheduling algorithm. In a second phase of the scheduling, the remaining resources can be analyzed to determine the appropriate location for the requested resource.

In the example allocation for a VM, many different factors can be weighted in connection with assigning the VM within a given performance zone. For example, such allocation criteria can include capabilities of the performance zone such as accessibility to external resources including shared storage, backups, access to customer dedicated circuits, geographical location, availability of higher memory instances, availability of specific types of resources (e.g., GPU, SSD, Infiniband, higher host network capacity, etc.). Yet another type of criteria can be an anti-affinity calculation used for business continuity purposes (e.g., place VM_Y far away from VM_X). Each of these allocation criteria can be weighed with a different weight. In some embodiments, a performance zone criteria, meaning a preference to provision resources within a single physical performance zone, can be weighted highest, although the performance zone criteria can be weighted differently in other implementations.

As further seen in FIG. 5, when the request includes a request for placement in a particular performance zone and no resources are available in that zone to handle the request, instead control passes to block 445 where the request can be failed. In other implementations instead of failing the request, a requested resource can be provided in a different performance zone, and an indication of this different performance zone can be communicated to the user. Thus in this case, it is likely that the resource will be provided with a lesser or no quality of service guarantee. However, it is also possible to allocate an amount of bandwidth, e.g., requested or predetermined, between this VM and other VMs within the requested performance zone by way of a dedication of a tunnel with the amount of bandwidth.

Referring still to FIG. 5, if at diamond 420 the resource request is received without a performance zone request, control passes instead to diamond 430. There it can be determined whether an available resource is present within a given performance zone, namely a particular performance zone with which the customer is associated. If so, control passes to block 450 where as discussed above a resource within that performance zone can be assigned to the user. Otherwise control passes to block 460 where a resource outside of that performance zone can be assigned to the user. From both of blocks 450 and 460, control passes to block 470 where the resource can be provisioned and information regarding the provisioned resource can be sent to the user.

As examples of the operations involved in provisioning the resource in the context of a virtual machine, the virtual machine can be spun up and initial state information can be provided to the virtual machine. Although the scope of the present invention is not limited in this regard, such state information can include passwords, predetermined users, predetermined connections to specific logical networks (and IP allocations on the virtual interfaces associated with each one), predetermined connections to specific external storage repositories and so forth). As for the communication back to the user, it can be as simple as a confirmation that the requested resource has been allocated. In addition, the communication can include identification information to enable communications to be directed to the resource. For example, this identification information may correspond to actions occurring outside of the VM, which can include logically wiring the VM's interfaces to participate in the proper logical switches (e.g., via OpenFlow, LISP, or other technologies), requesting and routing any required IP addresses, applying any requested firewall policies and QoS parameters to the logical ports the VM will use and so forth. Note that customer management portals, billing, monitoring, or any notification based orchestration engines can receive provisioning "success" messages and process them within their systems. Although shown with this particular illustration in the embodiment of FIG. 5, understand the scope of the present invention is not limited in this regard.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    an access layer having a plurality of server collections, each including a plurality of servers;
    an aggregation layer having a plurality of first switching devices each coupled to a portion of the plurality of server collections to enable communications with ones of the plurality of server collections coupled to the corresponding first switching device;
    a core layer including a plurality of second switching devices, each coupled to a portion of the plurality of first switching devices, to enable communications with others of the plurality of server collections not connected to the corresponding first switching device;
    a plurality of performance zones, each performance zone formed of and corresponding to a logical collection of the portion of the plurality of server collections coupled to the same first switching device, wherein communication within a performance zone is optimized as compared to communications between performance zones;
    a single logical network for a first customer, the single logical network formed of at least some of the plurality of performance zones;
    a logical aggregation layer to logically couple a first performance zone and a second performance zone, wherein the first performance zone comprises a full mesh network including a first plurality of servers each logically coupled to each of the others of the first plurality of servers via a virtual switch;
    a scheduler to dynamically allocate an on-demand resource requested by the first customer on one of the first plurality of servers, wherein the first customer is associated with a performance zone identifier for the first performance zone, wherein the on-demand resource is allocated with a quality of service guarantee when the on-demand resource is allocated within the first performance zone and without a quality of service guarantee when the on-demand resource is not allocated within the first performance zone; and
    a logical switch having a table for the first customer including a plurality of entries, each of which associates an on-demand resource of the first customer to a performance zone identifier corresponding to the given performance zone, wherein the logical switch enables the first customer to view a plurality of on-demand resources of the first customer located in different performance zones as the single logical network to abstract the performance zones away from the first customer.

2. The system of claim 1, wherein the scheduler is to weight a request by the first customer for allocation within the first performance zone with a first value and to weight a second allocation criteria with a second value.

3. The system of claim 2, wherein the scheduler is to schedule the on-demand resource to the first performance zone based on the weighted allocation request and the weighted second allocation criteria.

4. The system of claim 1, wherein the on-demand resource comprises a database resource within the first performance zone or a storage resource coupled to the first performance zone via the aggregation layer and the core layer.

5. The system of claim 1, wherein each performance zone is a constrained logical portion of the single logical network.

6. The system of claim 1, further comprising a logic to trigger an event to create a network reservation via at least one tunnel when the first customer provisions a second resource in the second performance zone, wherein the first customer previously provisioned a first resource in the first performance zone.

7. The system of claim 6, wherein the network reservation is of a predetermined bandwidth.

8. The system of claim 1, wherein when the on-demand resource is not allocated within the first performance zone, a tunnel having a first amount of bandwidth is dedicated between the on-demand resource and other on-demand resources within the second performance zone.

* * * * *